United States Patent
Jin et al.

(10) Patent No.: US 12,542,281 B2
(45) Date of Patent: Feb. 3, 2026

(54) ELECTRODE PLATE, AND BATTERY CELL, BATTERY AND ELECTRICAL DEVICE RELATED THERETO

(71) Applicant: CONTEMPORARY AMPEREX TECHNOLOGY (HONG KONG) LIMITED, Hong Kong (CN)

(72) Inventors: Haizu Jin, Ningde (CN); Shuangjuan Peng, Ningde (CN); Baiqing Li, Ningde (CN); Mingxiang Lin, Ningde (CN); Fenggang Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/191,810

(22) Filed: Apr. 28, 2025

(65) Prior Publication Data

US 2025/0253342 A1 Aug. 7, 2025

Related U.S. Application Data

(63) Continuation of application No. PCT/CN2023/072019, filed on Jan. 13, 2023.

(51) Int. Cl.
*H01M 4/62* (2006.01)
*H01M 4/02* (2006.01)
*H01M 4/13* (2010.01)

(52) U.S. Cl.
CPC ............ *H01M 4/623* (2013.01); *H01M 4/13* (2013.01)

(58) Field of Classification Search
None
See application file for complete search history.

(56) References Cited

U.S. PATENT DOCUMENTS

2004/0101752 A1 * 5/2004 Oosawa .............. H01M 4/0416
  252/182.1
2015/0357648 A1 * 12/2015 Sugimoto ............. H01M 4/622
  429/217

(Continued)

FOREIGN PATENT DOCUMENTS

CN 112349906 A 2/2021
CN 113113603 A * 7/2021 ........ H01M 10/0525

(Continued)

OTHER PUBLICATIONS

The World Intellectual Property Organization (Wipo) International Search Report for PCT/CN2023/072019 Jun. 23, 2023 5 Pages (including translation).

(Continued)

*Primary Examiner* — Tracy M Dove
(74) *Attorney, Agent, or Firm* — ANOVA LAW GROUP, PLLC

(57) ABSTRACT

An electrode plate includes a current collector and an active substance layer disposed on at least one surface of the current collector. The active substance layer includes an active substance and a polymer, and the active substance layer satisfies Formulas (1) to (3).

$$\lambda = 1 - \frac{P_1}{P_2} \quad \text{Formula (1)}$$

$$v = \pi \times \left(\frac{d}{2}\right)^2 \times h \times \frac{\rho}{t} \quad \text{Formula (2)}$$

$$v/\lambda > 1.00 \quad \text{Formula (3)}$$

13 Claims, 6 Drawing Sheets

(56) References Cited

U.S. PATENT DOCUMENTS

| | | | |
|---|---|---|---|
| 2017/0207457 A1* | 7/2017 | Yue | H01M 4/661 |
| 2018/0219250 A1* | 8/2018 | Delobel | H01M 10/058 |
| 2022/0271294 A1* | 8/2022 | Yamada | H01M 4/0404 |

FOREIGN PATENT DOCUMENTS

| | | | | |
|---|---|---|---|---|
| CN | 114388811 A | | 4/2022 | |
| CN | 114695869 A | | 7/2022 | |
| CN | 115004401 A | | 9/2022 | |
| CN | 115124638 A | * | 9/2022 | H01M 4/623 |
| CN | 115133035 A | | 9/2022 | |
| KR | 20150114463 A | | 10/2015 | |
| WO | WO-2021015229 A1 | * | 1/2021 | C09D 127/16 |

OTHER PUBLICATIONS

The Korean Intellectual Property Office Request for the Submission of an Opinion for Application No. 10-2025-7004794 Nov. 27, 2025 16 Pages (including translation).

\* cited by examiner

ELECTRODE PLATE, AND BATTERY CELL, BATTERY AND ELECTRICAL DEVICE RELATED THERETO

CROSS-REFERENCE TO RELATED APPLICATION

This application is a continuation of International Application No. PCT/CN2023/072019, filed on Jan. 13, 2023, which is hereby incorporated by reference in its entirety.

TECHNICAL FIELD

The present application relates to the field of battery, and particularly an electrode plate and a battery cell, a battery and an electrical device related thereto.

BACKGROUND

Battery cells have the characteristics such as high capacity and long life, so they are widely used in electronic devices, such as cellphones, laptop computers, battery cars, electric cars, electric airplanes, electric boats, electric toy cars, electric toy boats, electric toy airplanes, and power tools, and the like.

With the increasingly wide range of battery applications, the requirements for battery cell performance are becoming progressively more stringent. In order to improve the safety performance of battery cells, the performance of electrode plates in battery cells is usually optimized and improved. However, at present, the active substance in the electrode plate still has poor liquid absorption performance, which leads to poor cycle performance of a battery cell when the active substance is applied in the battery cell.

SUMMARY

The present application has been made in view of the above-described problems, and an object of the present application is to provide an electrode plate, and a battery cell, a battery and an electrical device related thereto.

The first aspect of the present application provides an electrode plate including a current collector and an active substance layer disposed on at least one surface of the current collector, wherein the active substance layer includes an active substance and a polymer, and the active substance layer satisfies:

$$\lambda = 1 - \frac{P_1}{P_2}, \quad \text{Formula (1)}$$

$$v = \pi \times \left(\frac{d}{2}\right)^2 \times h \times \frac{\rho}{t}, \quad \text{Formula (2)}$$

$$v/\lambda > 1.00, \quad \text{Formula (3)}$$

where in Formula (1) to Formula (3),
λ represents a porosity of the active substance layer;
$P_1$ represents an actual compaction density of the active substance layer, in unit of g/cm³;
$P_2$ represents a true compaction density of the active substance, in unit of g/cm³;
v represents a liquid absorption rate of the active substance layer, in unit of mg/s;
d represents a diameter of a capillary tube in a capillary test for the active substance layer, in unit of mm;
h represents a liquid level height in the capillary tube, in unit of mm;
ρ represents a density of an electrolytic solution in the capillary test, in unit of g/cm³;
t represents time during which the electrolytic solution is absorbed in the capillary tube, in unit of s.

Accordingly, the polymer in the present application is introduced during the preparation process of the active substance layer, which can form a uniform high infiltration point inside the active substance layer and uniformly improve infiltration performance on the active substance layer, thereby increasing liquid absorption speed of the entire active substance layer and thus improving cycle performance of a battery cell using the electrode plate.

In some embodiments, the active substance includes a positive electrode active substance, and the active substance layer satisfies: 1.00<v/λ<4.00; optionally, 1.20≤v/λ≤3.80.

In some embodiments, the active substance includes a positive electrode active substance, and a mass percentage content of the polymer is A %, based on a mass of the active substance layer, wherein 0.1≤A≤1.5. When the mass percentage content of the polymer is within the above range, the liquid absorption ability of the positive electrode active substance layer can be significantly improved.

In some embodiments, the active substance includes a negative electrode active substance, and the active substance layer satisfies: 3.00<v/λ<50.00; optionally, 3.40≤v/λ≤30.00.

In some embodiments, the active substance includes a negative electrode active substance, and a mass percentage content of the polymer is B %, based on a mass of the active substance layer, wherein 0.2≤B≤5.0. When the mass percentage content of the polymer is within the above range, the liquid absorption ability of the negative electrode active substance layer can be significantly improved.

In some embodiments, the polymer has a crystallinity of $X_C$% as measured by differential scanning calorimetry, and $0<X_C≤30$; and the polymer has a melting temperature of Tm, in unit of °C., and 0<Tm≤140.

Accordingly, since the polymer and the electrolytic solution in battery cell have good affinity in the present application, the solvent in the electrolytic solution can quickly diffuse between the molecular chains of the polymer and be wrapped by the molecular chains, and an in-situ gel can be formed on the surface of the active substance, which improves the infiltration performance of the electrolytic solution into the active substance layer, thereby improving the liquid absorption speed of the entire active substance layer and thus improving the cycle performance of the battery cell using the electrode plate.

In some embodiments, the polymer has a glass transition temperature of Tg, in unit of °C., and −150≤Tg≤60. The polymer has a relatively low glass transition temperature, the segments of the molecular chain are more flexible, the adjacent molecular chains are easier to be disentangled, and it is easier to form an in-situ gel, thereby improving the infiltrating performance of the electrolytic solution into the active substance layer, thereby improving the cycle performance of battery cells.

In some embodiments, the polymer includes at least one of a structural unit represented by Formula (I) to a structural unit represented by Formula (III), $$-\left(\begin{array}{c}R_1\\|\\C\\|\\R_2\end{array}-\begin{array}{c}R_3\\|\\C\\|\\R_4\end{array}\right)_n- \quad \text{Formula (I)}$$

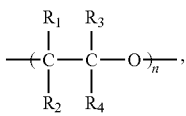
Formula (II)

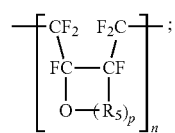
Formula (III)

in Formula (I) and Formula (II), $R_1$, $R_2$, $R_3$, and $R_4$ each independently comprises a hydrogen atom, a fluorine atom, a chlorine atom, an unsubstituted C1-C3 alkyl group or a substituted C1-C3 alkyl group with a substituent comprising a fluorine atom, or an unsubstituted C1-C3 alkoxy group or a substituted C1-C3 alkoxy group with a substituent comprising a fluorine atom, and at least one of $R_1$, $R_2$, $R_3$, and $R_4$ comprises a fluorine atom; in formula (III), $R_5$ comprises a single bond, an unsubstituted C1-C3 alkylene group or a substituted C1-C3 alkylene group with a substituent comprising a fluorine atom; p is a positive integer selected from 1 to 3; n is a positive integer selected from 1000 to 30000.

Therefore, the polymer of the present application has a straight-chain linear structure or a short-chain branched structure, and this type of structure has a relatively low degree of entanglement, which is beneficial to improving the flexibility of molecular chain, and the molecular chain can be sufficiently stretched in the electrolytic solution, thereby further improving the infiltrating performance of the electrolytic solution into the active substance.

In some embodiments, $R_1$, $R_2$, $R_3$, and $R_4$ each independently includes a hydrogen atom, a fluorine atom, a chlorine atom, a substituted or unsubstituted C1-C2 alkyl group, or a substituted or unsubstituted C1-C2 alkoxy group; further optionally, $R_1$, $R_2$, $R_3$, and $R_4$ each independently includes a hydrogen atom, a fluorine atom, a chlorine atom, a methyl group, a fluoromethyl group, a methoxy group, or a perfluoromethoxy group.

In some embodiments, the polymer includes at least one of a structural unit represented by Formula (I-1) to a structural unit represented by Formula (I-11),

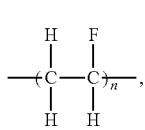
Formula (I-1)

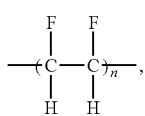
Formula (I-2)

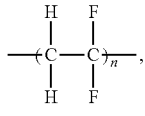
Formula (I-3)

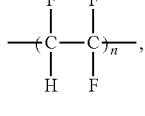
Formula (I-4)

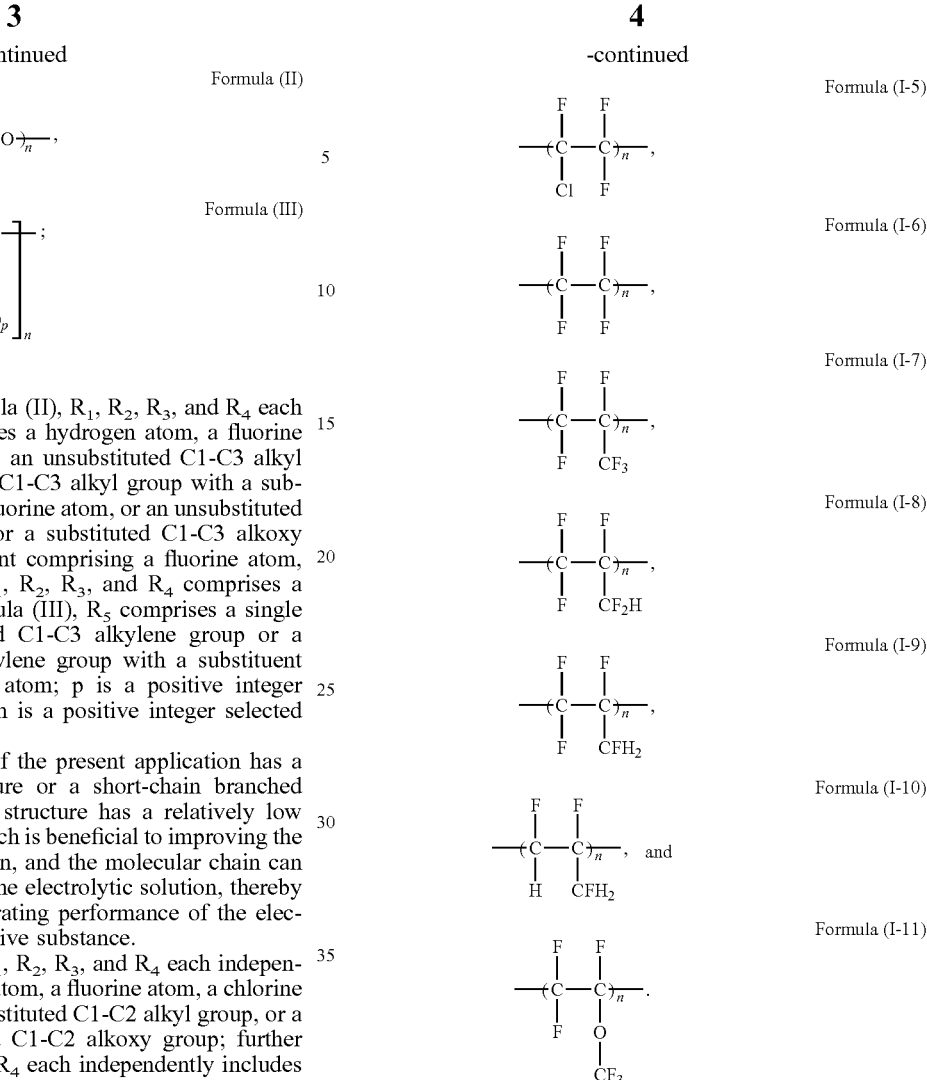

In some embodiments, the polymer includes at least one of a structural unit represented by Formula (II-1) to a structural unit represented by Formula (II-5),

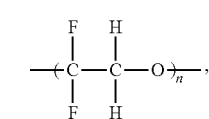
Formula

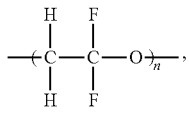
Formula (II-2)

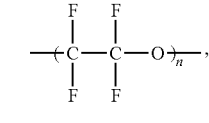
Formula

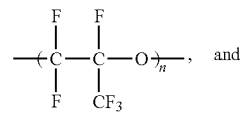
Formula (II-4)

Formula (II-5)

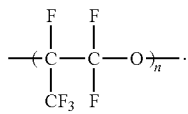

In some embodiments, the polymer includes at least one of a structural unit represented by Formula (III-1) to a structural unit represented by Formula (III-3), Formula (III-1)

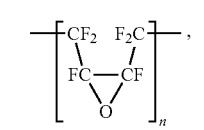

Formula (III-2)

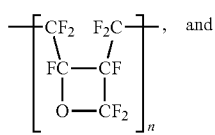

and

Formula (III-3)

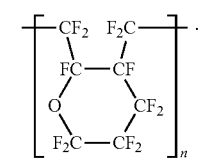

In some embodiments, n is a positive integer selected from 5000 to 20000.

In some embodiments, the polymer has a molecular weight of $2\times10^5$ g/mol to $1.5\times10^6$ g/mol. When the molecular weight of the polymer is within the above range, it can ensure that the polymer exhibits a certain solubility in the electrolytic solution and meanwhile the polymer is not easily dissolved and dispersed completely by the electrolytic solution, which is beneficial to regulating the distribution and dispersion of the polymer on the surface of the active substance, and can allow the electrolytic solution to uniformly infiltrate the active substance layer, thereby improving the liquid absorption speed of the entire active substance layer and improving the cycle performance of the battery cell using the electrode plate; in addition, it can further improve the flexibility between the molecular chains of the polymer and result in a relatively weak force between the molecular chains, which is beneficial for the solvent molecules in the electrolytic solution to separate the molecular chains and enter between the molecular chains, and be wrapped by the molecular chains, thereby facilitating the active ions to enter the active substance through the solvent, realizing the smooth and rapid migration of the active ions, and improving the kinetic performance of the battery cell.

The second aspect of the present application provides a battery cell, including the electrode plate according to any one of the embodiments of the first aspect of the present application.

The third aspect of the present application provides a battery, including the battery cell according to the second aspect of the present application.

The fourth aspect of the present application provides an electrical device, including the battery cell according to the third aspect of the present application.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the drawings without creative work.

Figure 1:
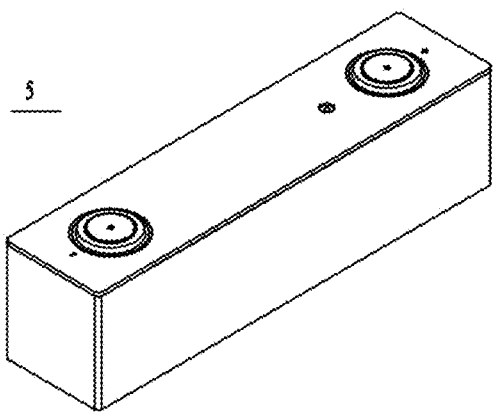
FIG. 1 is a schematic diagram of a battery cell according to an embodiment of the present application.

The drawings are not necessarily drawn to actual scale.

THE REFERENCE SIGNS ARE EXPLAINED AS FOLLOWS

1, a battery pack; 2, an upper case body; 3, a lower case body; 4, a battery module;
5, a battery cell; 51, a housing; 52, an electrode assembly; 53, a cover plate
6, an electrical device.

DETAILED DESCRIPTION

Hereafter, embodiments of the polymer, the electrode plate and the battery cell, the battery and the electrical device related thereto of the present application will be specifically described in detail. However, unnecessary detailed description may be omitted. For example, detailed descriptions of well-known items and repeated descriptions of substantially the same configurations may be omitted. This is to avoid the following description from becoming unnecessarily lengthy and to facilitate the understanding of those skilled in the art. In addition, the drawings and the following description are provided for those skilled in the art to fully understand the present application, and are not intended to limit the subject matter described in the claims.

A "range" disclosed herein is defined in terms of lower and upper limits, and a given range is defined by selecting a lower limit and an upper limit that define the boundaries of the particular range. Ranges defined in this manner may be inclusive or exclusive of end values and may be combined arbitrarily, that is, any lower limit may be combined with any upper limit to form a range. For example, if ranges of 60-120 and 80-110 are listed for a particular parameter, it is to be understood that ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution. Unless stated otherwise, all technical features and optional technical features of the present application can be combined with each other to form a new technical solution.

Unless stated otherwise, all steps of the present application can be carried out sequentially, and also can be carried out randomly, ins some embodiments they are carried out sequentially. For example, a method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprising" and "including" mentioned in the present application means that it is drafted in an open mode. For example, the phases "comprising" and "including" may mean that other components not listed may or may not also be included or contained.

In the present application herein, unless otherwise stated, the term "or" is inclusive. For example, the phrase "A or B" means "A, B, or both A and B." More specifically, any of the following conditions satisfy the condition "A or B": A is true (or exists) and B is false (or does not exist); A is false (or does not exist) and B is true (or exists); or both A and B are true (or exist). In this disclosure, the phrases "at least one of A, B, and C" and "at least one of A, B, or C" both mean only A, only B, only C, or any combination of A, B, and C.

In this application, the terms "plurality", "a plurality of" and "multiple" and "several" refer to two or more.

The term "alkyl" encompasses both linear and branched alkyl groups. For example, an alkyl group may be C1 to C5 alkyl, C1 to C4 alkyl, C1 to C3 alkyl, or C1 to C2 alkyl. In some embodiments, the alkyl group includes methyl, ethyl, propyl, isopropyl, butyl, isobutyl, and the like. In addition, the alkyl group may be optionally substituted. When a group is substituted, the substituent includes a fluorine atom.

The term "alkoxy" refers to a group in which an alkyl group is connected to an oxygen atom through a single bond. For example, the alkoxy group may be $C_1$ to $C_5$ alkoxy, $C_1$ to $C_3$ alkoxy, or $C_1$ to $C_2$ alkoxy. In some embodiments, an alkoxy group may include a methoxy group, an ethoxy group, or a propoxy group. In addition, the alkoxy group may be optionally substituted.

The term "halogen atom" refers to atoms such as a fluorine atom, a chlorine atom, a bromine atom, and the like.

The term "hydrogen" refers to 1H (protium, H), 2H (deuterium, D) or 3H (tritium, T). In various embodiments, "hydrogen" may be 1H (protium, H).

The battery cell comprises an electrode assembly and an electrolytic solution, and the electrode assembly comprises a positive electrode plate, a negative electrode plate, and a separator disposed between the positive electrode plate and the negative electrode plate. The electrode assembly has gap-pore structure, and the electrolytic solution infiltrates into the electrode assembly. The driving force of the infiltration is mainly capillary force, which is in a spontaneous infiltration and absorption process. Due to the barrier of the current collector in the electrode plate, the electrolytic solution infiltrates into the electrode assembly from the end face of the electrode assembly through infiltration and absorption of the separator. As a result, the layer gap of the electrode assembly provides a solution guiding action, while the separator provides a solution diversion action. The step of infiltration of the electrolytic solution inside the electrode assembly includes: (1) The electrolytic solution is transmitted in the gap between the electrode plate and the separator under the action of capillary force; (2) The electrolytic solution preferentially percolates in the pores of the separator (the infiltration rate of the electrolytic solution in the separator is much higher than that in the active substance layer of the electrode plate); (3) The electrolytic solution diffuses to the surfaces of the positive electrode plate and the negative electrode plate on both sides through the separator and seeps into the pores of the active substance layer.

The inventors have found that it is needed to use a polymer as a binder in the active substance layer to bond the active substance to the surface of the current collector, and since the polymer needs to be immersed in the electrolytic solution for a long time, in order to ensure the performance of the polymer, a polymer having a high crystallinity is usually used, so as to maintain a good bonding and supporting effect of the active substance layer. However, the electrode plate using the above polymer has poor affinity with the electrolytic solution, and relatively poor infiltration of the electrode plate, resulting in a slow diffusion rate of the electrolytic solution from the surface of the active substance layer to the inside of the active substance layer, and a relatively poor liquid absorption performance of the active substance, thereby deteriorating the cycle performance of the battery cell.

In view of this, from the viewpoint of improving the liquid absorption rate of the active substance layer, the inventors have improved a substance (such as a polymer) in the active substance layer, in order to increase the liquid absorption rate and thereby improve the cycle performance of the battery cell.

Electrode Plate

In the first aspect, the present application provides an electrode plate, comprising a current collector and an active substance layer disposed on at least one surface of the current collector, wherein the active substance layer comprises an active substance and a polymer. The electrode plate may be a positive electrode plate and/or a negative electrode plate; accordingly, the positive electrode plate comprises a positive active substance layer; and the negative electrode plate comprises a negative active substance layer.

The electrode plate can be formed by applying a slurry on a current collector, followed by drying and cold-pressing. Alternatively, the electrode plate is derived from a battery cell, by disassembling the battery cell, taking out the electrode plate infiltrated in an electrolytic solution in the battery cell, and placing the electrode plate infiltrated in the electrolytic solution under the condition of 100° C. for vacuum drying for 12 hours to obtain said electrode plate, and the electrode plate is used for electrode plate tests such as test for liquid absorption rate.

The polymer can be synthesized by emulsion polymerization, suspension polymerization, bulk polymerization, solution polymerization and the like. Alternatively, the polymer is derived from a battery cell, by disassembling the battery cell, taking out the electrode plate infiltrated in an electrolytic solution in the battery cell, peeling off the active substance of the obtained electrode plate by an external force to form a powder sample, adding the powder sample to dimethyl carbonate (DMC), stirring at 80° C. for 8 hours @500 rpm, then allowing to stand at room temperature for 10 minutes after the stirring is completed, and taking the supernatant at 80° C., and drying for 12 hours to obtain the polymer. The resulting polymer may be mixed with a little lithium salt, but the salt basically does not affect the infrared test and precipitation value test; In order to ensure the accuracy of tests on the polymer, flushing with DMC at room temperature may be used to remove the lithium salt.

The active substance layer satisfies:

$$\lambda = 1 - \frac{P_1}{P_2}, \quad \text{Formula (1)}$$

$$v = \pi \times \left(\frac{d}{2}\right)^2 \times h \times \frac{\rho}{t}, \quad \text{Formula (2)}$$

$$v/\lambda > 1.00, \quad \text{Formula (3)}$$

where in Formula (1) to Formula (3), $\lambda$ represents a porosity of the active substance layer;

$P_1$ represents an actual compaction density of the active substance layer, in unit of $g/cm^3$;

$P_2$ represents a true compaction density of the active substance, in unit of $g/cm^3$;

v represents a liquid absorption rate of the active substance layer, in unit of mg/s, d represents a diameter of a capillary tube in a capillary test for the active substance layer, in unit of mm;

h represents a liquid level height in the capillary tube, in unit of mm;

$\rho$ represents a density of an electrolytic solution in the capillary test, in unit of $g/cm^3$;

t represents time during which the electrolytic solution is absorbed in the capillary tube, in unit of s.

In the present application, the actual compaction density $P_1$ refers to the ratio of the mass to the thickness of the active substance layer per area in the electrode plate. The actual compaction density is influenced by the force of rolling after coating the electrode plate, and expressed in unit of $g/cm^3$. A specific test includes the steps of taking an electrode plate with a certain area S, weighing the mass M of active substance layer in the electrode plate, and measuring the thickness D of the active substance layer, and the actual compaction density=M/(S×D).

In the present application, the true compaction density $P_2$ refers to the density of the active substance itself in the active substance layer. Taking active substance being negative electrode active substance as an example, such as graphite, the density of the graphite is 2.25 $g/cm^3$, then the active substance has a true compaction density of 2.25 $g/cm^3$.

Taking the positive electrode active substance as an example, specifically, it refers to the true compaction density determined according to P=m/V where m is the mass of the "solid substance per actual volume" (excluding open holes and closed holes and pores between particles) in a dense state, V is the true volume obtained by testing, which can be tested with reference to GB/T24586-2009. Specifically, the test steps may be as follows:

1) Pre-treatment: Taking a clean and dry sample cup and placing it on a balance, taring it, adding a powder sample to the sample cup, with the powder sample accounting for about ½ of the volume of the sample cup, and recording a mass of the sample;

2) Placing the sample cup containing the sample in a true density tester, sealing the test system, introducing helium gas according to the program, measuring the gas pressure in the sample chamber and the expansion chamber, and then calculating the true volume according to Bohr's law (PV=nRT), to calculate the true compaction density.

In the test, the sample cup has a volume of 3.5 $cm^3$, and helium is used as analytical gas.

According to the Formula (1), the porosity k of the active substance layer can be calculated by using the actual compaction density and the true compaction density. Specifically, $$\lambda = \frac{V1 - V2}{V1} = 1 - \frac{V2}{V1} = 1 - \frac{m/V1}{m/V2} = 1 - \frac{P_1}{P_2}.$$

V1 represents the volume of the active substance layer having a mass m, in unit of $cm^3$;

V2 represents the volume occupied by active particles in the active substance layer having a mass m, in unit of $cm^3$;

m represents the mass of the active substance layer, in unit of g.

Equation (2) can characterize the speed at which a certain point of an electrode plate basically completely absorbs the liquid (such as electrolytic solution) in capillary tube per unit time. In the present application, a certain point of the electrode plate refers to a region in which the electrode plate has a certain area which corresponds to the cross-sectional area of the capillary tube.

In the present application, a method for measuring the liquid absorption rate of an electrode plate includes the following steps:

Sucking a predetermined amount of electrolytic solution using a capillary tube;

Contacting the capillary tube with the electrode plate, allowing the electrode plate to be measured to absorb the electrolytic solution in the capillary tube under capillary action;

After a predetermined time period t, recording the liquid level height h at which the electrolytic solution in the capillary tube is absorbed, and calculating the amount of the absorbed electrolytic solution by using the liquid level height h and the diameter d of the capillary tube and the density p of the electrolytic solution, and then quantitatively calculating the liquid absorption rate v of the electrode plate based on the ratio of the absorbed amount and the predetermined time period t.

Exemplarily, d may be a value from 0.2 to 1, e.g. a value of 0.2; h may be a value from 3 to 5, e.g. a value of 3.

The capillary tube has a capillary channel to enable the capillary tube to directly suck the electrolytic solution through capillary action, without the need for an external drive unit to provide the sucking force. In this way, on the one hand, when the electrolytic solution is sucked through capillary action, the suction amount can be controlled more accurately; On the other hand, because the electrode plate to be measured absorbs the electrolytic solution through its own capillary action only when the electrode plate is in contact with the capillary tube, the electrode plate sucks the electrolytic solution out from the capillary tube, and when the electrode plate is out of contact, the electrolytic solution in the capillary tube no longer flows out, so that the reduced amount of electrolytic solution in the capillary tube during the contact can accurately reflect the corresponding volume of electrolytic solution absorbed by the electrode plate, thereby further improving the accuracy of test results and realizing quantitative calculation of the absorption rate of electrolytic solution absorbed by the electrode plate.

Formula (3) represents a liquid absorption rate of an electrode plate at a porosity X, and may be used to characterize the liquid absorption rate of the electrode plate.

The polymer in the present application is introduced during the preparation process of the active substance layer, which can form a uniform high infiltration point inside the active substance layer and uniformly improve infiltration performance on the active substance layer, thereby increasing liquid absorption speed of the entire active substance layer and thus improving cycle performance of a battery cell using the electrode plate.

Optionally, $1.00<v/\lambda<50.00$.

In some embodiments, the polymer has a crystallinity of $X_C\%$ as measured by differential scanning calorimetry, and $0<X_C\leq30$; and the polymer has a melting temperature of Tm, in unit of ° C., and $0<Tm\leq140$.

Crystallization refers to the process in which atoms, ions or molecules in a material are arranged in a certain spatial order to form an ordered structure. The conformation of polymers during crystallization is determined by both intra-molecular and inter-molecular factors. Inter-molecular forces will affect the packing density between molecular chains. Crystallinity, expressed as $X_C\%$, is used to characterize the degree of crystallization in a material, which can be measured by differential scanning calorimetry (DSC). Specifically, the testing procedure is as follows: taking 0.5 g to 0.8 g of a sample, placing the sample in a carrier crucible, carrying out a heating and cooling treatment on the sample under nitrogen atmosphere, with a heating rate of 10° C./min from an initial temperature 20° C. lower than the intrinsic Tg of the material to a final temperature 20° C. higher than the intrinsic Tm of the material, and determining the actual glass transition temperature Tg and melting temperature Tm of the material based on the endothermic and exothermic peaks or transition points of the material during the process.

Compared to the fluoropolymers commonly used in secondary batteries in the related technologies, which have relatively high crystallinity and melting temperature, resulting in good resistance to liquid-phase electrolytes and thus providing long-term effective adhesion or rebound suppression for active substance during battery use. The above-mentioned polymers (fluoropolymers) used in the present application has relatively low crystallinity and melting temperature, resulting in a tendency toward a looser arrangement of molecular chains, a weaker interaction force between molecular chains, thereby allowing to exert the flexibility of chain segments and easily separate the adjacent molecular chains.

Since the polymer and the electrolytic solution in battery cell have good affinity, the solvent in the electrolytic solution can quickly diffuse between the molecular chains of the polymer and be wrapped by the molecular chains, and an in-situ gel can be formed on the surface of the active substance, which improves the infiltration performance of the electrolytic solution into the active substance layer, thereby improving the liquid absorption speed of the entire active substance layer and thus improving the cycle performance of the battery cell using the electrode plate.

Exemplarily, the crystallinity $X_C\%$ of the polymer as measured by differential scanning calorimetry may be 5%, 10%, 15%, 20%, 25%, 30%, or a range composed of any two of the above values.

Exemplarily, the melting temperature of the polymer may be 10° C., 20° C., 50° C., 70° C., 90° C., 100° C., 120° C., 140° C., or a range composed of any two of the above values.

In some embodiments, the polymer has a glass transition temperature of Tg, in unit of ° C., and $-150\leq Tg\leq60$.

The glass transition temperature is the transition temperature at which segments of a polymer change from a freezing state to a moving state. The glass transition temperature has a certain influence on the flexibility of molecular chains of a polymer. The lower the glass transition temperature, the better the flexibility of molecular chains of a polymer at room temperature, and the higher the glass transition temperature, the worse the flexibility of molecular chains at room temperature. The glass transition temperature can be measured using differential scanning calorimetry (DSC). The polymer has a relatively low glass transition temperature, the segments of the molecular chain are more flexible, the adjacent molecular chains are easier to be disentangled, and it is easier to form an in-situ gel, thereby improving the infiltrating performance of the electrolytic solution into the active substance layer, thereby improving the cycle performance of battery cells. Exemplarily, the glass transition temperature of the fluoropolymer may be −150° C., −140° C., −120° C., −100° C., −80° C., −60° C., −30° C., 0° C., 30° C., 60° C., or a range composed of any two of the above values.

In some embodiments, the polymer includes at least one of a structural unit represented by Formula (I) to a structural unit represented by Formula (III),

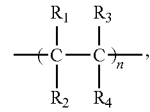

Formula (I)

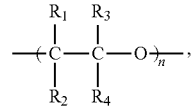

Formula (II)

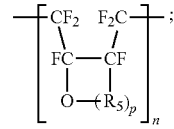

Formula (III)

in Formula (I) and Formula (II), $R_1$, $R_2$, $R_3$, and $R_4$ each independently comprises a hydrogen atom, a fluorine atom, a chlorine atom, an unsubstituted C1-C3 alkyl group or a substituted C1-C3 alkyl group with a substituent comprising a fluorine atom, or an unsubstituted C1-C3 alkoxy group or a substituted C1-C3 alkoxy group with a substituent comprising a fluorine atom, and at least one of $R_1$, $R_2$, $R_3$, and $R_4$ comprises a fluorine atom.

in formula (III), $R_5$ comprises a single bond, an unsubstituted C1-C3 alkylene group or a substituted C1-C3 alkylene group with a substituent comprising a fluorine atom. p is a positive integer selected from 1 to 3.

n is a positive integer selected from 1000 to 30000.

In some embodiments, $R_1$, $R_2$, $R_3$, and $R_4$ each independently comprises a hydrogen atom, a fluorine atom, a chlorine atom, an unsubstituted C1-C2 alkyl group or a substituted C1-C2 alkyl group, and at least one of $R_1$, $R_2$, $R_3$, and $R_4$ comprises a fluorine atom.

In some embodiments, $R_1$, $R_2$, $R_3$, and $R_4$ each independently comprises a hydrogen atom, a fluorine atom, a chlorine atom, a methyl group, a fluoromethyl group, a methoxy group, or a perfluoromethoxy group.

In some embodiments, the polymer includes at least one of a structural unit represented by Formula (I-1) to a structural unit represented by Formula (I-11),

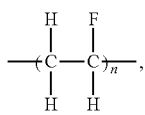
Formula (I-1)

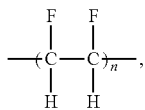
Formula (I-2)

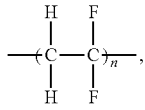
Formula (I-3)

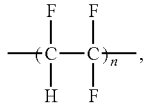
Formula (I-4)

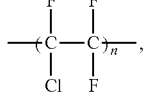
Formula (I-5)

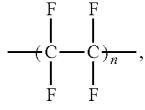
Formula (I-6)

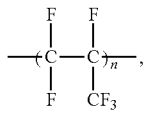
Formula (I-7)

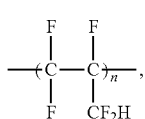
Formula (I-8)

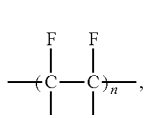
Formula (I-9)

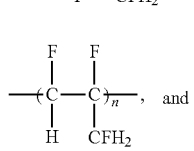
Formula (I-10)
and

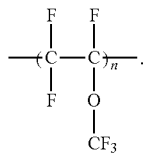
Formula (I-11)

Optionally, the polymer includes at least two of a structural unit represented by Formula (I-1) to a structural unit represented by Formula (I-11), In some embodiments, the polymer includes at least one of a structural unit represented by Formula (II-1) to a structural unit represented by Formula (II-5),

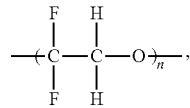
Formula (II-1)

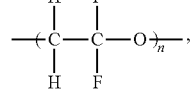
Formula (II-2)

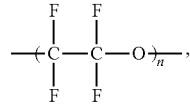
Formula (II-3)

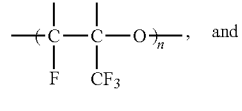
Formula (II-4)
and

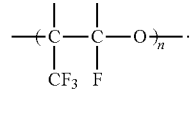
Formula (II-5)

In some embodiments, the polymer includes at least one of a structural unit represented by Formula (III-1) to a structural unit represented by Formula (III-3),

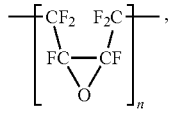
Formula (III-1)

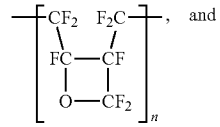
Formula (III-2)
and

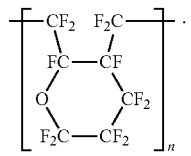
Formula (III-3)

Exemplarily, the polymer comprises one or more of polyperfluoroethylene (PTFE), polyvinylidene fluoride (PVDF), fluorinated ethylene propylene copolymer (FEP), perfluoroalkoxy polymer (PFA), perfluoropolyether (PFPE), polyvinylidene fluoride-hexafluoropropylene copolymer (PVDF-HFP), polyvinylidene fluoride-trifluoroethylene copolymer (PVDF-TrFE), and perfluoro(1-butenyl vinyl ether) polymer (CYTOP).

Optionally, the polymer comprises one or more of polyperfluoroethylene (PTFE), polyvinylidene fluoride (PVDF), fluorinated ethylene propylene copolymer (FEP), polyvinylidene fluoride-hexafluoropropylene copolymer (PVDF-HFP), and polyvinylidene fluoride-trifluoroethylene copolymer (PVDF-TrFE).

The above polymer may be derived from one or more of the following monomers: fluorocycloethane, fluoroethylene, 1,2-difluoroethylene, vinylidene fluoride, trifluoroethylene, chlorotrifluoroethylene, tetrafluoroethylene, hexafluoropropylene, 3,3,3-trifluoropropene, trifluoropropene, tetrafluoropropene and pentafluoropropene, and the like. Optionally, the above polymer may be derived from at least two of the following monomers: fluorocycloethane, fluoroethylene, 1,2-difluoroethylene, vinylidene fluoride, trifluoroethylene, chlorotrifluoroethylene, tetrafluoroethylene, hexafluoropropylene, 3,3,3-trifluoropropene, trifluoropropene, tetrafluoropropene and pentafluoropropene.

The monomers used in the above polymer are all short-chain monomers, which are favorable for polymerization to form a straight-chain linear structure or a short-chain branched structure. This type of structure has a relatively low degree of entanglement, which is beneficial to improving the flexibility of molecular chains, and the molecular chains can be sufficiently stretched in the electrolytic solution, thereby further improving the infiltrating performance of the electrolytic solution into the active substance, and improving the interface performance of the active substance.

The group of the polymer of the present application can be detected by infrared spectrophotometry IR. Specifically, the polymer is tested by a Thermo Nicolet Nexus 670 Attenuated Total reflection Fourier Transform Infrared spectrometer (FTIR-ATR), with reference to GB/T6040-2002, within the test range: ATR method 600-4000 cm$^{-1}$; repeatability: ±2 cm$^{-1}$; resolution: better than 4 cm$^{-1}$; and transmission depth of 0.2-0.6 μm.

The structure of the polymer of the present application can be tested using Nuclear Magnetic Resonance (NMR). Specifically, 1H NMR and 13C NMR are performed on a Varian Mercury Plus-400 nuclear magnetic resonance instrument at a test temperature of 20° C., with TMS as an internal standard, CDCl$_3$ as a solvent, and a proton resonance frequency of 400 MHz.

In some embodiments, n is a positive integer selected from 5000 to 20000.

In some embodiments, the polymer has a molecular weight of $2 \times 10^5$ g/mol to $1.5 \times 10^6$ g/mol.

When the molecular weight of the polymer is within the above range, it can ensure that the polymer exhibits a certain solubility in the electrolytic solution and meanwhile the polymer is not easily dissolved and dispersed completely by the electrolytic solution, which is beneficial to regulating the distribution and dispersion of the polymer on the surface of the active substance, and can allow the electrolytic solution to uniformly infiltrate the active substance layer, thereby improving the liquid absorption speed of the entire active substance layer and improving the cycle performance of the battery cell using the electrode plate; in addition, it can further improve the flexibility between the molecular chains of the polymer and result in a relatively weak force between the molecular chains, which is beneficial for the solvent molecules in the electrolytic solution to separate the molecular chains and enter between the molecular chains, and be wrapped by the molecular chains, thereby facilitating the active ions to enter the active substance through the solvent, realizing the smooth and rapid migration of the active ions. Exemplarily, the polymer may have a molecular weight of $2 \times 10^5$ g/mol, $5 \times 10^5$ g/mol, $8 \times 10^5$ g/mol, $1 \times 10^6$ g/mol, $1.5 \times 10^6$ g/mol or a range composed of any two of the above values.

The molecular weight of the polymer has a well-known meaning in the art, and can be measured by equipment and methods commonly used in the art. It can be tested by Gel Permeation Chromatography (GPC). The specific test procedure is as follows: taking an appropriate amount of a sample to be measured (the sample concentration is guaranteed to be 8%-12% shading), adding 20 ml of deionized water while sonicating the resulting mixture for 5 min (53 KHz/120 W) to ensure that the sample is completely dispersed, and then measuring the sample according to GB/T19077-2016/ISO 13320:2009 standard.

Alternatively, a multi-angle laser scatterometer MALLS may be used for testing. Specifically, an instrument of GPC in combination with a Dawn Heleos Model II multi-angle laser light scattering apparatus, an Optilab T-rEX Refractive Index (RI) detector and a Visco Star Model II viscometer (Wyatt Technology Corporation, USA) is used. The test is performed at 30° C. using tetrahydrofuran as the mobile phase, at a flow rate of 1.0 ml/min. The commercial software ASTRA6 is used to process the SEC-SAMLL data to obtain molecular weight parameters.

The inventors have found, through further research, that when the polymer further meets one or more of the following conditions, the cycle performance of the battery cell can be further improved.

In some embodiments, the polymer is added to a first solvent at a first temperature to form a polymer system; The polymer system is allowed to stand for 8 hours at the first temperature, and for ≥24 hours at the second temperature. After the above two stages of standing treatment, the polymer system is partially or completely transformed in situ into a gel state substance. The polymer system is then filtered through a 200-mesh filter screen to remain a first substance, wherein the first temperature is greater than the second temperature. The polymer and the first substance satisfy: 5≤m/n≤1000, in which n represent a mass of the polymer, in unit of gram, and m represents a mass of the first substance, in unit of gram; optionally, 10≤m/n≤1000; further optionally, 10≤m/n≤50. Exemplarily, m/n may be 5, 10, 20, 25, 28, 30, 32, 35, 40, 50, 80, 100, 200, 500, 1000, or a range composed of any two of the above values.

Exemplarily, based on the mass of the polymer system, a ratio of the mass content of the polymer and the mass content of the first solvent ranges from 1:100 to 1:10, such as 3:50.

Exemplarily, the first solvent is the same as or similar to the solvent of the electrolytic solution, and the first solvent may comprise a carbonate-based solvent. For example, a carbonate-based solvent comprise a cyclic carbonate solvent and/or a linear carbonate solvent.

Examples of the cyclic carbonate solvent comprise one or more of ethylene carbonate (EC), vinylene carbonate (VC), fluoroethylene carbonate (FEC), difluoroethylene carbonate (DFEC), vinyl ethylene carbonate (VEC), and dicarpylyl carbonate (CC).

As an example, the linear carbonate solvent comprises one or more of dimethyl carbonate (DMC), diethyl carbonate (DEC), ethyl methyl carbonate (EMC), diphenyl carbonate (DPC), methyl acrylate carbonate (MAC), and polycarbonate.

Optionally, the first solvent may simultaneously contain a lithium salt and an additive for an electrolytic solution, such as lithium hexafluorophosphate, vinylene carbonate (VC), fluoroethylene carbonate (FEC), and the like.

In the present application, m/n is also referred to as a precipitation value, which characterizes the ability of the polymer and solvent to transform into a gel-state substance.

The first substance mainly comprises a gel-state substance formed by a polymer and a first solvent, and in the gel-state substance, the molecular structure of the polymer substantially keep unchanged.

In some embodiments, the first substance is dried at 80° C. for 12 hours to remove the first solvent from the first substance, and is tested by infrared spectrophotometry (IR) or nuclear magnetic resonance (NMR). The main component of the first substance after drying is the polymer as described above.

In the present application, the first temperature is equal to or greater than the glass transition temperature of the polymer and is equal to or less than the melting temperature of the polymer, and the first temperature is a normal use temperature of a battery cell.

The first temperature is greater than the second temperature, and the first temperature and the second temperature both may be set within the safe operating temperature range of the battery cell. By way of example, the first temperature may be 60° C. to 80° C., such as 70° C., and the second temperature may be −30° C. to 30° C., such as 25° C. That is, the first temperature is a relatively high operating temperature of a battery cell, and the second temperature is approximately normal temperature or a low temperature.

In the present application, by increasing the temperature, the stretching of the polymer molecular chain can be realized within the safe working temperature range of a battery cell, which promotes the mutual attraction and physical binding between the polymer molecular chains and the solvent, thereby improving the liquid absorption ability. At normal temperature, the polymer molecular segments have decreases mobility, and remain attached to the surface of the active substance and lock the electrolytic solution in the space environment where the polymer is located, thereby forming a state similar to an in-situ gel, improving the liquid locking ability and improving the cycle performance.

[Positive Electrode Plate]

The positive electrode plate comprises a positive electrode current collector and a positive electrode active substance layer disposed on at least one surface of the positive electrode current collector, and the positive electrode active substance layer comprises a positive electrode active substance and a polymer. In the present application, the polymer comprises the polymer as previously described.

For example, the positive current collector has two opposite surfaces along the thickness direction of the positive electrode current collector, and the positive electrode active substance layer is disposed on one or both of the two opposite surfaces of the positive electrode current collector.

In some embodiments, $1.00 < v/\lambda < 4.00$; optionally, $1.20 \leq v/\lambda \leq 3.80$; further optionally, $1.4 \leq v/\lambda \leq 3.6$. Exemplarily, $v/\lambda$ may be 1.20, 1.40, 1.80, 2.00, 2.50, 3.00, 3.50, 3.60, 3.80, 3.90, or a range composed of any two of the above values.

In some embodiments, a mass percentage content of the polymer is A %, based on a mass of the positive electrode active substance layer, wherein $0.1 \leq A \leq 1.5$.

When the mass percentage content of the polymer is within the above range, the liquid absorption ability of the positive electrode active substance layer can be significantly improved. Exemplarily, the mass percentage content A % of the polymer may be 0.1%, 0.2%, 0.5%, 0.8%, 1.0%, 1.2%, 1.5%, or a range composed of any two of the above values.

The positive electrode active substance layer comprises a positive electrode active substance, and the positive electrode active substance can be a positive electrode active substance known in the art for battery cell. As an example, the positive electrode active substance may comprise at least one of the following materials: a positive electrode active substance having layered structure (for example, ternary material, lithium/sodium nickel oxide, lithium/sodium cobalt oxide, lithium/sodium manganese oxide, lithium/sodium-rich materials having layered structure and rock-salt phase layered structure), an olivine-type phosphate active substance, and a positive electrode active substance having spinel structure (for example, spinel lithium manganese oxide, spinel lithium nickel manganese oxide, lithium-rich spinel lithium manganese oxide and lithium nickel manganese oxide, and the like).

Exemplarily, the positive electrode active substance having layered structure has the general formula: $Li_xA_yNi_aCo_bMn_cM_{(1-a-b-c)}Y_z$, wherein $0 \leq x \leq 2.1$, $0 \leq y \leq 2.1$, and $0.9 \leq x+y \leq 2.1$; $0 \leq a \leq 1$, $0 \leq b \leq 1$, $0 \leq c \leq 1$, and $0.1 < a+b+c \leq 1$; $1.8 \leq z \leq 3.5$; A is selected from one or more of Na, K, Mg; M is selected from one or more of B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, Ce; and Y is selected from one or more of O and F. Optionally, y=0. Specifically, the positive electrode active substance having layered structure may comprise one or more of lithium cobalt oxide (LCO), lithium nickel oxide (LNO), lithium manganese oxide (LMO), $LiNi_{1/3}Co_{1/3}Mn_{1/3}O_2$(NCM333), $LiNi_{0.8}Co_{0.1}Mn_{0.1}O_2$ (NCM811) and $LiNi_{0.5}Co_{0.2}Mn_{0.3}O_2$ (NCM523).

Exemplarily, the olivine-type phosphate active substance has the general formula: $Li_xA_yMe_aM_bP_{1-c}X_cY_z$, wherein $0 \leq x \leq 1.3$, $0 \leq y \leq 1.3$, and $0.9 \leq x+y \leq 1.3$; $0.9 \leq a \leq 1.5$, $0 \leq b \leq 0.5$, and $0.9 \leq a+b \leq 1.5$; $0 \leq c \leq 0.5$; $3 \leq z \leq 5$; A is selected from one or more of Na, K, Mg; Me is selected from Mn, Fe, Co, and Ni; M is selected from one or more of B, Mg, Al, Si, P, S, Ca, Sc, Ti, V, Cr, Cu, Zn, Sr, Y, Zr, Nb, Mo, Cd, Sn, Sb, Te, Ba, Ta, W, Yb, La, and Ce; X is selected from one or more of S, Si, Cl, B, C, and N; and Y is selected from one or more of O and F. Specifically, the olivine-type phosphate active substance comprises one or more of $LiFePO_4$, $LiMnPO_4$, $LiNiPO_4$, and $LiCoPO_4$.

Exemplarily, the positive electrode active substance having spinel structure has the general formula: $Li_xA_yMn_aM_{2-a}Y_z$, wherein $0 \leq x \leq 2$, $0 \leq y \leq 1$, and $0.9 \leq x+y \leq 2$; $0.5 \leq a \leq 2$; $3 \leq z \leq 5$; A is selected from one or more of Na, K, Mg; M is selected from one or more of Ni, Co, B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and Y is selected from one or more of O and F. Specifically, the positive electrode active substance having spinel structure comprises one or more of $LiMn_2O_4$, $LiNi_{0.5}Mn_{1.5}O_4$, $LiCr_{0.3}Mn_{1.7}O_4$, $Li_{1.1}Al_{0.1}Mn_{1.9}O_4$, $Li_2Mn_2O_4$ and $Li_{1.5}Mn_2O_4$.

In some embodiments, the positive electrode current collector may be a metal foil or a composite current collector. As an example of the metal foil, an aluminum foil or an aluminum alloy foil may be used. The composite current collector may comprise a polymeric material base layer and a metal material layer formed on at least one surface of the polymeric material base layer. For example, the metal material may comprise, one or more selected from aluminum, aluminum alloy, nickel, nickel alloy, titanium, titanium alloy, silver, and silver alloy. The polymeric material base layer may comprise one or more selected from polypropylene (PP), polyethylene terephthalate (PET), polybutylene terephthalate (PBT), polystyrene (PS), and polyethylene (PE).

In some embodiments, the positive electrode active substance layer may optionally comprise a positive electrode conductive agent. The present application is not particularly limited to the type of the positive electrode conductive agent. As an example, the positive electrode conductive agent comprises one or more of superconducting carbon, conductive carbon black, conductive graphite, acetylene black, carbon black, Ketjen black, carbon dots, carbon nanotubes, graphene and carbon nanofibers. In some embodiments, the mass percentage content of the positive electrode conductive agent is 5% or lower, based on the total mass of the positive electrode active substance layer.

In some embodiments, the positive electrode active substance layer may optionally comprise a positive electrode binder. The present application is not particularly limited to the type of the positive electrode binder. For example, the positive electrode binder may comprise one or more selected from polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin. In some embodiments, the mass percentage content of the positive electrode binder is 5% or lower, based on the total mass of the positive electrode active substance layer. The crystallinity of the positive electrode binder is higher than that of the polymer as described above, and the melting temperature of the positive electrode binder is higher than that of the polymer as described above.

The positive electrode active substance layer is usually formed by applying a positive electrode slurry on a positive electrode current collector, drying and cold-pressing. The positive electrode slurry is usually formed by dispersing a positive electrode active substance, the polymer, an optional conductive agent, an optional positive electrode binder and any other components in a solvent and stirring them uniformly. The solvent may be N-methylpyrrolidone (NMP), but is not limited thereto.

[Negative Electrode Plate]

The negative electrode plate comprises a negative electrode current collector and a negative electrode active substance layer disposed negative least one surface of the negative electrode current collector, and the negative electrode active substance layer comprises a negative electrode active substance and a polymer. In the present application, the polymer comprises the polymer as previously described.

For example, the negative current collector has two opposite surfaces along the thickness direction of the negative electrode current collector, and the negative electrode active substance layer is disposed on one or both of the two opposite surfaces of the negative electrode current collector.

In some embodiments, $3.00<v/\lambda<50.00$; optionally, $3.40 \leq v/\lambda \leq 30.00$. Exemplarily, $v/\lambda$ may be 3.20, 3.40, 3.50, 4.00, 4.50, 5.00, 5.50, 6.00, 6.50, 7.00, 8.00, 9.00, 9.50, 10.00, 10.50, 11.00, 12.00, 13.00, 14.00, or a range composed of any two of the above values.

In some embodiments, a mass percentage content of the polymer is B %, based on a mass of the negative electrode active substance layer, wherein $0.2 \leq B \leq 5.0$. When the mass percentage content of the polymer is within the above range, the liquid absorption ability of the negative electrode active substance layer can be significantly improved. Exemplarily, the mass percentage content B % of the polymer may be 0.2%, 0.5%, 0.8%, 1.0%, 1.2%, 1.5%, 2.0%, 2.5%, 3.0%, 3.5%, 4.0%, 4.5%, 5.0%, or a range composed of any two of the above values.

In some embodiments, the negative electrode current collector may be a metal foil or a composite current collector. For example, a copper foil may be used as a metal foil. The composite current collector may comprise a polymeric material base layer and a metal layer formed on at least one surface of the polymeric material base layer. The composite current collector may be formed by forming a metal material (such as copper, copper alloy, nickel, nickel alloy, titanium, titanium alloy, silver, silver alloy, and the like) on a polymeric material base layer (such as a base layer of polypropylene (PP), polyethylene terephthalate (PET), polybutylene terephthalate (PBT), polystyrene (PS), polyethylene (PE), and the like).

In some embodiments, the negative electrode active substance may be a negative electrode active substance commonly known in the art for batteries. As an example, the negative electrode active substance may include at least one of artificial graphite, natural graphite, soft carbon, hard carbon, a silicon-based material, a tin-based material, and lithium titanate, and the like. The silicon-based material may be selected from at least one of elemental silicon, a silicon oxide compound, a silicon carbon composite, a silicon nitrogen composite, and a silicon alloy. The tin-based material may be selected from at least one of elemental tin, a tin oxide compound, and a tin alloy. However, the present application is not limited to these materials, and other conventional materials that may be used as negative electrode active substance for batteries may alternatively be used. These negative electrode active substance may be used alone or in combination of two or more.

In some embodiments, the negative electrode active substance layer may optionally comprise a negative electrode binder. The negative electrode binder may be selected from at least one of styrene butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS). The crystallinity of the negative electrode binder is higher than that of the polymer as described above, and the melting temperature of the negative electrode binder is higher than that of the polymer as described above.

In some embodiments, the negative electrode active substance layer may optionally comprise a negative electrode conductive agent. The conductive agent may be selected from at least one of superconducting carbon, acetylene black, carbon black, Ketjen black, carbon dots, carbon nanotubes, graphene, and carbon nanofibers.

In some embodiments, the negative electrode active substance layer may optionally further include other auxiliaries, such as a thickener (such as carboxymethyl cellulose sodium (CMC-Na)) and the like.

In some embodiments, the negative electrode plate may be prepared by the following steps: dispersing components for preparing the negative electrode plate, such as negative electrode active substance, the polymer, a conductive agent, a negative electrode binder, and any other components in a solvent (for example, deionized water) to form a negative electrode slurry; applying the negative electrode slurry onto the negative electrode current collector, followed by the processes such as drying and cold-pressing, to obtain the negative electrode plate.

Battery Cell

In a second aspect, the present application provides a battery cell comprising a positive electrode plate, a negative electrode plate, a separator disposed between the positive electrode plate and the negative electrode plate, and an electrolyte. The battery cell may be a lithium-ion battery or the like.

In some embodiments, as the positive electrode plate, the positive electrode plate according to any one of the embodiments of the first aspect of the present application may be used, thereby improving the cycle performance of the battery cell. A conventional electrode plate may be used as the negative electrode plate.

In some embodiments, the negative electrode plate according to any embodiment of the first aspect of the present application may be used as the negative electrode plate, thereby improving the cycle performance of the battery cell. A conventional electrode plate may be used as the positive electrode plate.

In some embodiments, the positive electrode plate according to any one of the embodiments of the first aspect of the present application may be used as the positive electrode plate, and the negative electrode plate according to any embodiment of the first aspect of the present application may be used as the negative electrode plate, thereby improving the cycle performance of the battery cell.

[Electrolyte]

The battery cell also comprises an electrolyte, which serves to conduct ions between the positive electrode plate and the negative electrode plate. There is no specific limitation on the type of electrolyte in the present application, and it can be selected according to the requirement. For example, the electrolyte may be in a liquid state, a gel state, or an all-solid state.

In some embodiments, an electrolytic solution is used as the electrolyte. The electrolytic solution comprises an electrolyte salt and a solvent.

As an example, the lithium salt may comprise one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium difluorosulfimide (LiFSI), lithium bistrifluoromethanesulfonimide (LiTFSI), lithium trifluoromethanesulfonate (LiTFS), lithium difluorooxalate (LiDFOB), lithium bisoxalate (LiBOB), lithium difluorophosphate ($LiPO_2F_2$), lithium difluorobisoxalate phosphate (LiDFOP), and lithium tetrafluorooxalate phosphate (LiTFOP).

As an example, the organic solvent may comprise one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may further optionally comprise an additive. For example, the additive may comprise a negative electrode film-forming additive, a positive electrode film-forming additive, as well as an additive that can improve certain performance of batteries, such as an additive that improves overcharge performance of batteries, an additive that improves high-temperature performance of batteries, and an additive that improves low-temperature performance of batteries.

[Separator]

In some embodiments, the battery cell further comprises a separator. The type of the separator is not particularly limited in the present application, and any well-known porous separator having good chemical stability and mechanical stability can be selected.

In some embodiments, the separator may be made of a material selected from one or more of glass fiber, non-woven fabric, polyethylene, polypropylene and polyvinylidene fluoride. The separator can be a single-layer film or a multilayer composite film. When the separator is a multilayer composite film, the materials of individual layers may be the same or different.

In some embodiments, the positive electrode plate, the separator, and the negative electrode plate may be manufactured into an electrode assembly by a winding process or a staking process.

The present application does not have particular limitation on the shape of the battery cell, which may be cylindrical, square, or in other arbitrary shapes. FIG. 1 shows a battery cell with a rectangular structure as an example.

Figure 2:
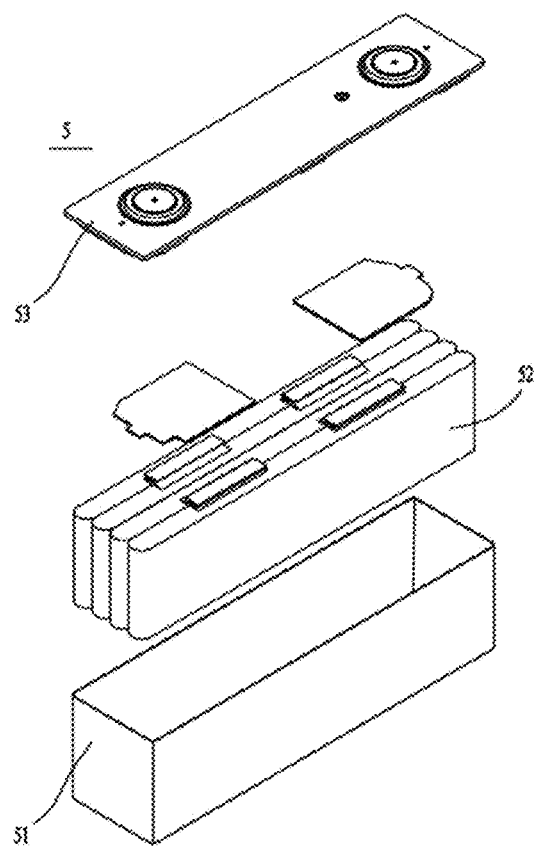
FIG. 2 is an exploded schematic diagram of the embodiment of the battery cell as shown in FIG. 1.

In some embodiments, as shown in FIG. 1 and FIG. 2, the outer packaging may include a housing 51 and a cover plate 53. In an example, the housing 51 may include a bottom plate and a side plate connected to the bottom plate, and the bottom plate and the side plate are combined to form an accommodating cavity. The housing 51 has an opening communicating with the accommodating cavity, and the cover plate 53 is used for covering the opening to close the accommodating cavity. The positive electrode plate, the negative electrode plate, and the separator may be stacked or wounded into a battery component 52. The battery assembly 52 is encapsulated in the accommodating cavity. The electrolytic solution is infiltrated in the electrode assembly 52. The battery cell 5 may include one or more electrode assemblies 52, which may be adjusted according to requirements.

The preparation method of the battery cell of the present application is well known. In some embodiments, a positive electrode plate, a separator, a negative electrode plate, and electrolytic solution can be assembled to form a battery cell. As an example, the positive electrode plate, the separator, and the negative electrode plate may form an electrode assembly by a winding process or a stacking process; the battery assembly is placed in an outer package and dried, then the electrolytic solution is injected, followed by vacuum packing, steady standing, formation, and shaping and other processes, thereby obtaining a battery cell.

In some embodiments of the present application, the battery cell according to the present application may be assembled into a battery module. The battery module may include a plurality of battery cells, and the specific quantity may be adjusted according to the application and capacity of the battery module.

Figure 3:
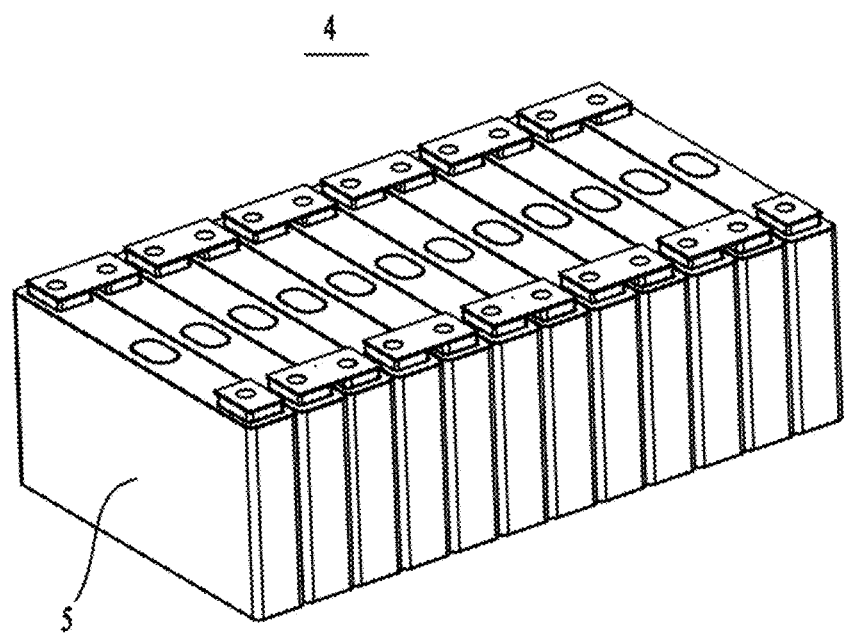
FIG. 3 is a schematic diagram of a battery module according to an embodiment of the present application.

FIG. 3 is a schematic diagram of a battery module 4 as an example. As shown in FIG. 3, in the battery module 4, a plurality of battery cells 5 may be arranged and disposed sequentially along the length direction of the battery module 4. Apparently, they may also be disposed in any other manner. Further, the plurality of battery cells 5 may be fixed by a fastener.

Optionally, the battery module 4 may further include a housing having a accommodating space, and the plurality of battery cells 5 are accommodated in the accommodating space.

In some embodiments, the above-mentioned battery module may also be assembled into a battery pack, and the quantity of battery modules contained in the battery pack may be adjusted according to the application and capacity of the battery pack.

Figure 4:
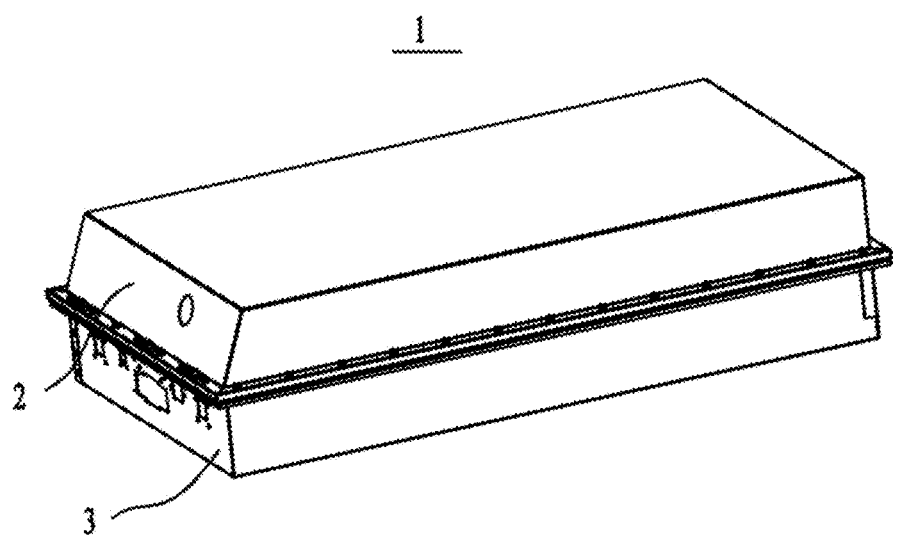
FIG. 4 is a schematic diagram of a battery pack according to an embodiment of the present application.
Figure 5:
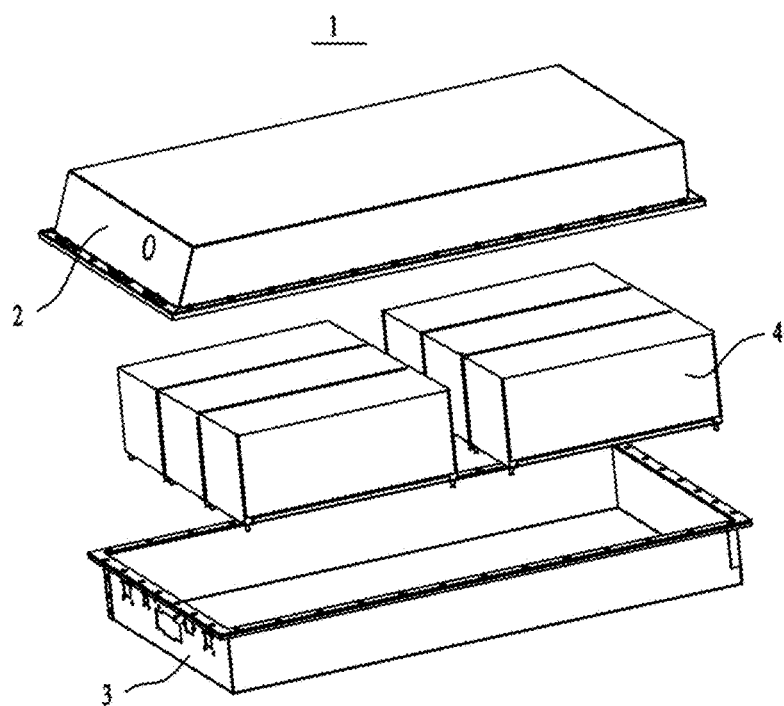
FIG. 5 is an exploded schematic diagram of the embodiment of the battery pack as shown in FIG. 4.

FIGS. 4 and 5 are schematic diagrams of battery pack 1 as an example. As shown in FIGS. 4 and 5, the battery pack 1 may comprise a battery case and a plurality of the battery modules 4 disposed in the battery case. The battery case comprises an upper case body 2 and a lower case body 3. The upper case body 2 is used for covering the lower case body 3 to form a closed space for accommodating the battery modules 4. A plurality of battery modules 4 may be disposed in the battery case in any manner.

Both the battery module and the battery pack may be used as examples of the batteries of the present application.

Electrical Device

In a third aspect, the present application provides an electrical device, which comprises at least one of the battery cell, the battery module, and the battery pack of the present application. The battery cell, the battery module, and the battery pack may be used as a power source of the electrical device or as an energy storage unit of the electrical device. The electrical device may be, but is not limited to, a mobile device (such as, a mobile phone and a laptop computer, and the like), an electric vehicle (such as a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, or the like.

Figure 6:
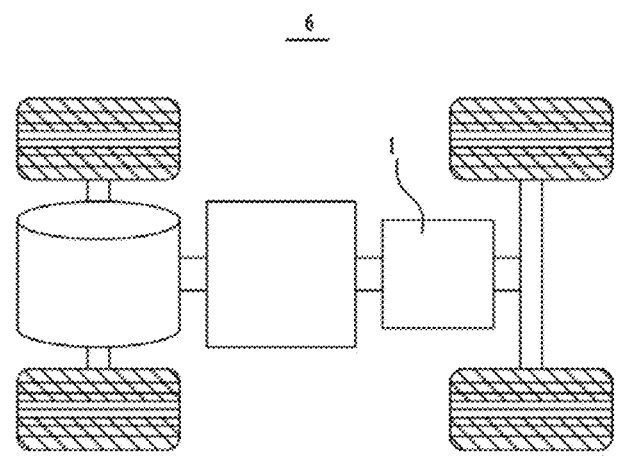
FIG. 6 is a schematic diagram of an embodiment of an electrical device of the present application comprising the battery cell of the present application as a powder supply.

The electrical device may comprise the battery cell, the battery module or the battery pack selected according to its usage requirements. FIG. 6 is a schematic diagram of an electrical device as an example. The electrical device 6 is a pure electric vehicle, a hybrid electric vehicle, or a plug-in hybrid electric vehicle. In order to meet requirements of the electrical device for high power and high energy density, the battery pack 1 or the battery module may be used. As another example, the electrical device may be a mobile phone, a tablet computer, a notebook computer, and the like. The electric device is generally required to be light and thin, and a battery cell may be used as a power supply.

EXAMPLES

Hereinafter, embodiments of the present application will be described. The embodiments described below are exemplary and are merely used to explain the present application, and are not to be construed as limiting the present application. If specific techniques or conditions are not specified in the examples, the techniques or conditions described in the literature of the filed or the product specification shall be used. If the manufacturer of the reagent or instrument used is not specified, it is a conventional product that is commercially available.

Example 1

(1) Preparation of Positive Electrode Plate:

An aluminum foil having a thickness of 12 μm was used as a positive electrode current collector.

The fluoropolymer and LiFePO$_4$ as a positive electrode active substance, carbon black as a conductive agent, polyvinylidene fluoride (PVDF) as a binder were added into N-methylpyrrolidone (NMP) to prepare a positive electrode slurry. The mass ratio of fluoropolymer, LiFePO$_4$, the conductive carbon black, PVDF and N-methylpyrrolidone (NMP) in the positive electrode slurry were 0.5:96.8:2:0.7:29. The positive electrode slurry was applied on the current collector of aluminum foil and dried at 85° C. followed by cold-pressing, trimming, slicing and slitting, and then drying under vacuum at 85° C. for 4 h, to obtain a positive electrode plate.

(2) Preparation of Negative Electrode Plate:

A copper foil with a thickness of 8 m was used as a negative electrode current collector.

Fluoropolymer, artificial graphite as a negative electrode active substance, carbon black as a conductive agent, styrene butadiene rubber (SBR) as an adhesive, sodium hydroxymethylcellulose (CMC) as a thickener, and deionized water were mixed in a mass ratio of 2.5:94:0.5:2:100 to prepare a negative electrode slurry. The negative electrode slurry was applied on the current collector of copper foil and dried at 85° C. followed by cold-pressing, trimming, slicing and slitting, and drying under vacuum at 120° C. for 12 h, to obtain a negative electrode plate.

(3) Preparation of Electrolyte:

In an environment with a water content of less than 10 ppm, ethylene carbonate EC and methyl ethyl carbonate (EMC) as non-aqueous organic solvents were mixed in a volume ratio of 3:7 to obtain an solvent for electrolytic solution. Then, the mixed solvent was mixed with lithium salt LiPF$_6$ to prepare an electrolytic solution with a lithium salt concentration of 1 mol/L.

(4) Preparation of Lithium-Ion Battery:

Polyethylene film (PE) with 16-micron thickness was used as a separator. The positive electrode plate, the separator, and the negative electrode place were stacked in order, so that the separator was located between the positive electrode plate and the negative electrode plate to provide isolation, and they were then wound up to obtain an electrode assembly; the electrode assembly was placed in a shell of an outer packaging shell and dried, followed by injecting the electrolytic solution. After vacuum sealing, steady standing, formation, shaping and other processes, a lithium-ion battery was obtained.

Comparative Example 1

A lithium-ion battery was prepared in a similar manner to that of Example 1, except that polyvinylidene fluoride (PVDF, having a crystallinity of 48% and a melting point of 164° C.) as a binder was added in the positive electrode plate of Comparative Example 1, without adding other fluoropolymer; In the negative electrode plate of Comparative Example 1, styrene-butadiene rubber as a binder was added without adding a fluoropolymer.

Comparative Example 2

A lithium ion battery was prepared in a similar manner to that of Example 1, except that fluoropolymers were used to replace the corresponding materials in the positive electrode plate and the negative electrode plate of Comparative Example 2, respectively.

Examples 2 to 4

A lithium ion battery was prepared in a similar manner to that of Example 1, except that fluoropolymers were used to replace the corresponding materials of the positive electrode plate and the negative electrode plate of Examples 2 to 4, respectively.

Examples 5 to 7

A lithium ion battery was prepared in a similar manner to that of Example 1, except that the amounts of the fluoropolymers in the positive electrode plates of Examples 5 to 7 were adjusted.

Examples 8 to 10

A lithium ion battery was prepared in a similar manner to that of Example 1, except that the amounts of the fluoropolymers in the negative electrode plates of Examples 8 to 10 were adjusted.

The data of Examples and Comparative Examples were shown in Table 1.

Test Section (1) Test of Capacity Retention Rate of Lithium-Ion Battery

Each of the above-mentioned lithium-ion batteries prepared in Examples and Comparative Examples was charged at a constant current of 1 C to 4.25 V in a normal temperature environment, then charged at a constant voltage of 4.25 V to a current of 0.05 C, allowed to stand for 5 minutes, and then discharged at 1 C to 2.8 V, and the obtained capacity was denoted as the initial capacity C0. The above steps was repeated for the same battery and the discharge capacity Cn of the battery after the $n^{th}$ cycle was recorded. Then the capacity retention rate Pn of the battery after each cycle was calculated by Pn=Cn/C0*100%. By using 1200 point values of P1, P2, . . . P1200 as the vertical axis and the corresponding number of cycles as the horizontal axis, a dot plot showing capacity retention rate of the battery as a function of the number of cycles was obtained.

During this test, the first cycle corresponds to n=1, the second cycle corresponds to n=2, . . . the $1200^{th}$ cycle corresponds to n=1200. For example, the datum of capacity retention rate of each battery corresponding to Example 1 in Table 1 was the datum measured after 1200 cycles under the above test conditions, that is, the value of P1200. The testing procedures of Comparative Example 1 and other Examples were the same as that described above.

(2) Test of Direct Current Impedance of Lithium-Ion Battery

Each of the above-mentioned lithium-ion batteries prepared in Examples and Comparative Examples was charged at a constant current of 1/3C to 4.25 V at 25° C., then charged at a constant voltage of 4.25 V to a current of 0.05 C, allowed to stand for 5 minutes, and the voltage V1 was recorded. Then, the battery was discharged at 1/3 C for 30 seconds, and the voltage V2 was recorded, then the internal resistance DCR1 of the battery after the first cycle was obtained by (V2-V1)/1/3 C. The above steps was repeated for the same battery and the internal resistance DCRn (n=1, 2, 3, . . . 1200) of the battery after the $n^{th}$ cycle was recorded. By using 1200 point values of the above DCR1, DCR2, DCR3, . . . DCR1200 as the vertical axis and the corresponding number of cycles as the horizontal axis, a graph showing the discharge DCIR of the battery as a function of the number of cycles was obtained.

During this test, the first cycle corresponds to n=1, the second cycle corresponds to n=2, . . . the $1200^{th}$ cycle corresponds to n=1200. For example, the internal resistance increase ratio of the battery of Example 1 being equal to (DCRn-DCR1)/DCR1*100% was shown in Table 1. The testing procedures of Comparative Example 1 and other Examples were the same as that described above. The data in Table 1 were the data measured after 1200 cycles under the above test conditions.

Test Results

TABLE 1

| | Fluoropolymer | | | | | | | |
|---|---|---|---|---|---|---|---|---|
| Items | Monomer 1 | Monomer 2 | Monomer 3 | Crystallinity Xc % | Melting temperature Tm (° C.) | Glass transition temperature Tg (° C.) | Molecular weight (g/mol) | Precipitation value m/n |
| Binder PVDF in positive electrode plate | 100% VDF | / | / | 48 | 164 | 39 | 800000 | 1.1 |
| Comparative Example 1 | / | / | / | / | / | / | / | / |
| Comparative Example 2 | 95% VDF | 5% TFE | / | 48 | 167 | 56 | 1300000 | 1.2 |
| Example 1 | 90% VDF | 10% HFP | / | 20 | 125 | −50 | 800000 | 20 |
| Example 2 | 80% VDF | 15% HEP | 5% TFE | 25 | 135 | 35 | 600000 | 25 |
| Example 3 | 75% VDF | 25% HFP | / | 11 | 112 | −65 | 650000 | 30 |
| Example 4 | 75% VDF | 22% HFP | 3% ethylene | 10 | 110 | −69 | 700000 | 32 |
| Example 5 | 90% VDF | 10% HFP | / | 20 | 125 | −50 | 800000 | 20 |

TABLE 1-continued

| | | | | | | | | |
|---|---|---|---|---|---|---|---|---|
| Example 6 | 90% VDF | 10% HFP | / | 20 | 125 | −50 | 800000 | 20 |
| Example 7 | 90% VDF | 10% HFP | / | 20 | 125 | −50 | 800000 | 20 |
| Example 8 | 90% VDF | 10% HFP | / | 20 | 125 | −50 | 800000 | 20 |
| Example 9 | 90% VDF | 10% HFP | / | 20 | 125 | −50 | 800000 | 20 |
| Example 10 | 90% VDF | 10% HFP | / | 20 | 125 | −50 | 800000 | 20 |

| | Positive electrode plate | | | | Negative electrode plate | | | | Lithium-ion battery | |
|---|---|---|---|---|---|---|---|---|---|---|
| Items | Mass percentage content of fluoropolymer A % | $\lambda$ | v (mg/s) | v/$\lambda$ | Mass percentage content of fluoropolymer B % | $\lambda$ | v (mg/s) | v/$\lambda$ | Capacity retention rate % | DCIR % |
| Binder PVDF in positive electrode plate | / | / | / | / | / | / | / | / | / | / |
| Comparative Example 1 | 0 | 24.8% | 0.20 | 0.81 | 0 | 29% | 0.50 | 1.72 | 80 | 60 |
| Comparative Example 2 | 0.5 | 24.8% | 0.18 | 0.73 | 2.5 | 29% | 0.52 | 1.79 | 81 | 58 |
| Example 1 | 0.5 | 24.8% | 0.38 | 1.53 | 2.5 | 29% | 2.50 | 8.62 | 85 | 48 |
| Example 2 | 0.5 | 24.8% | 0.45 | 2.02 | 2.5 | 29% | 4.00 | 13.8 | 83 | 42 |
| Example 3 | 0.5 | 27.9% | 0.50 | 1.79 | 2.5 | 33.3% | 5.00 | 15 | 82 | 42 |
| Example 4 | 0.5 | 27.9% | 0.52 | 1.86 | 2.5 | 33.3% | 5.60 | 16.8 | 83 | 42 |
| Example 5 | 0.1 | 24.8% | 0.35 | 1.41 | 2.5 | 29% | 2.50 | 8.62 | 85 | 48 |
| Example 6 | 1.5 | 24.8% | 0.90 | 3.63 | 2.5 | 29% | 2.50 | 18.62 | 86 | 46 |
| Example 7 | 0 | 24.8% | 0.20 | 0.81 | 2.5 | 29% | 2.50 | 8.62 | 85 | 48 |
| Example 8 | 0.5 | 24.8% | 0.50 | 2.02 | 0.2 | 29% | 1.00 | 3.44 | 87 | 45 |
| Example 9 | 0.5 | 24.8% | 0.50 | 2.02 | 5.0 | 29% | 8.00 | 27.6 | 89 | 42 |
| Example 10 | 0.5 | 24.8% | 0.50 | 2.02 | 0 | 29% | 0.50 | 1.72 | 85 | 48 |

In Table 1, VDF represents vinylidene fluoride, HFP represents hexafluoropropylene; TFE represents tetrafluoroethylene, wherein 90% VDF refers to a molar percentage of VDF being 90% based on the total molar amount of VDF and HFP, and 10% FEP refers to a molar percentage of FEP being 10%.

As can be seen from Table 1, compared with Comparative Example 1, the fluoropolymers of the present application were added in the positive electrode plates and negative electrode plates in Examples of the present application, which can form a uniform high infiltration point inside the active substance layers and uniformly improve infiltration performance on the active substance layers, thereby increasing liquid absorption speed of the entire active substance layers and thus improving cycle performance of the battery cells using the electrode plates.

Compared with Comparative Example 2, cycle performance of the lithium ion batteries can be further significantly improved in Examples of the present application where v/$\lambda$>1 is satisfied.

While the present application has been described with reference to some embodiments, various modifications may be made thereto and components therein may be replaced with equivalents without departing from the scope of the present application. In particular, the technical features mentioned in the various embodiments can be combined in any manner as long as there is no structural conflict. The present application is not limited to the specific embodiments disclosed herein, but includes all technical solutions falling within the scope of the claims.

What is claimed is:

1. An electrode plate, comprising a current collector and an active substance layer disposed on at least one surface of the current collector, the active substance layer comprising an active substance and a polymer, the active substance layer satisfying:

$$\lambda = 1 - \frac{P_1}{P_2}, \quad \text{Formula (1)}$$

$$v = \pi \times \left(\frac{d}{2}\right)^2 \times h \times \frac{\rho}{t}, \text{ and} \quad \text{Formula (2)}$$

$$v/\lambda > 1.00; \quad \text{Formula (3)}$$

wherein in Formula (1) to Formula (3):

λ represents a porosity of the active substance layer;

$P_1$ represents an actual compaction density of the active substance layer, in unit of g/cm³;

$P_2$ represents a true compaction density of the active substance, in unit of g/cm³;

v represents a liquid absorption rate of the active substance layer, in unit of mg/s;

d represents a diameter of a capillary tube in a capillary test for the active substance layer, in unit of mm;

h represents a liquid level height in the capillary tube, in unit of mm;

ρ represents a density of an electrolytic solution in the capillary test, in unit of g/cm³; and t represents time during which the electrolytic solution is absorbed in the capillary tube, in unit of s; and the polymer comprising a structural unit represented by Formula (III),

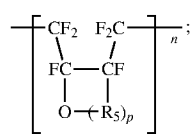

Formula (III)

wherein:

in Formula (III), $R_5$ comprises a single bond, an unsubstituted C1-C3 alkylene group or a substituted C1-C3 alkylene group with a substituent comprising a fluorine atom, p is a positive integer selected from 1 to 3;

in Formula (III), n is a positive integer selected from 1000 to 30000; and the structural unit represented by Formula (III) comprises at least one of a structural unit represented by Formula (III-1) to a structural unit represented by Formula (III-3),

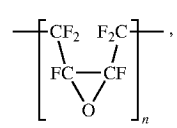

Formula (III-1)

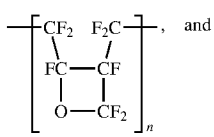, and

Formula (III-2)

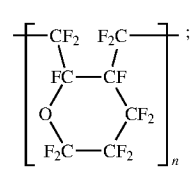;

Formula (III-3)

and in Formula (III-1) to Formula (III-3), n is a positive integer selected from 1000 to 30000.

2. The electrode plate according to claim 1, wherein:
the active substance comprises a positive electrode active substance; and
the active substance layer satisfies: 1.00<v/λ<4.00.

3. The electrode plate according to claim 1, wherein:
the active substance comprises a positive electrode active substance; and
a mass percentage content A % of the polymer, based on a mass of the active substance layer, satisfies 0.1≤A≤1.5.

4. The electrode plate according to claim 1, wherein:
the active substance comprises a negative electrode active substance; and
the active substance layer satisfies: 3.00<v/λ<50.00.

5. The electrode plate according to claim 1, wherein:
the active substance comprises a negative electrode active substance; and
a mass percentage content B % of the polymer, based on a mass of the active substance layer, satisfies 0.2≤B≤5.0.

6. The electrode plate according to claim 1, wherein:
a crystallinity of $X_c$% the polymer as measured by differential scanning calorimetry satisfies 0<$X_c$≤30; and
a melting temperature Tm of the polymer, in unit of ° C., satisfies 0<Tm≤140.

7. The electrode plate according to claim 1, wherein a glass transition temperature Tg of the polymer, in unit of ° C., satisfies -150≤Tg≤60.

8. The electrode plate according to claim 1, wherein:
in Formula (III), n is a positive integer selected from 5000 to 20000; and/or
the polymer has a molecular weight of 2×10⁵ g/mol to 1.5×10⁶ g/mol.

9. The electrode plate according to claim 1, wherein the polymer further comprises at least one of a structural unit represented by Formula (I-1) to a structural unit represented by Formula (I-11),

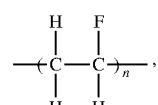

Formula (I-1)

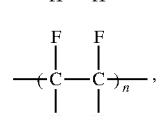,

Formula (I-2)

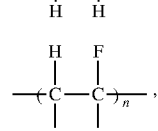,

Formula (I-3)

-continued

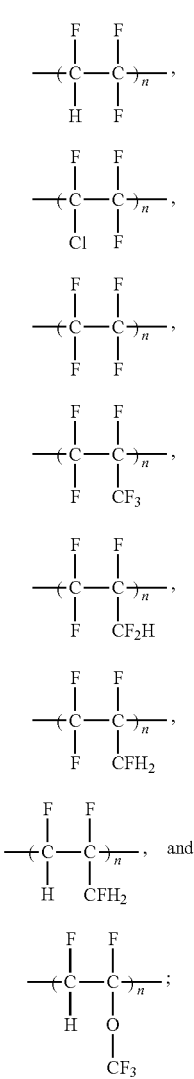

Formula (I-4)

Formula (I-5)

Formula (I-6)

Formula (I-7)

Formula (I-8)

Formula (I-9)

Formula (I-10)

Formula (I-11)

and
in Formula (I-1) to Formula (I-11), n is a positive integer selected from 1000 to 30000.

10. The electrode plate according to claim 1, wherein the polymer further comprises at least one of a structural unit represented by Formula (II-1) to a structural unit represented by Formula (II-5),

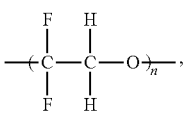

Formula (II-1)

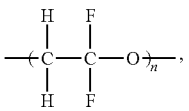

Formula (II-2)

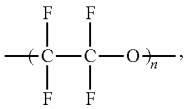

Formula (II-3)

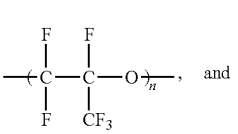

Formula (II-4)

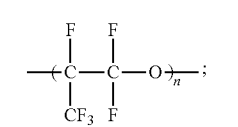

Formula (II-5)

and in Formula (II-1) to Formula (II-5), n is a positive integer selected from 1000 to 30000.

11. A battery cell, comprising the electrode plate according to claim 1.

12. A battery comprising the battery cell according to claim 11.

13. An electrical device, comprising the battery according to claim 12.

* * * * *